US012702621B2

(12) United States Patent
Carson et al.

(10) Patent No.: US 12,702,621 B2
(45) Date of Patent: Aug. 11, 2026

(54) PHARMACEUTICAL CONTAINERS INCLUDING HIGH CTE SEALING ASSEMBLY ENCIRCLING OUTER SURFACE OF CONTAINER

(71) Applicant: CORNING INCORPORATED, Corning, NY (US)

(72) Inventors: Michael Patrick Carson, Elmira, NY (US); Dane Alphanso Christie, Painted Post, NY (US); Galan Gregory Moore, Henrietta, NY (US); Connor Thomas O'Malley, Painted Post, NY (US); Adam Robert Sarafian, Corning, NY (US); Robert Anthony Schaut, Horseheads, NY (US); Mark Owen Weller, Painted Post, NY (US); Jiangtao Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 608 days.

(21) Appl. No.: 17/982,088

(22) Filed: Nov. 7, 2022

(65) Prior Publication Data

US 2023/0145946 A1 May 11, 2023

Related U.S. Application Data

(60) Provisional application No. 63/277,488, filed on Nov. 9, 2021.

(51) Int. Cl.
*A61J 1/14* (2023.01)
*B65D 51/00* (2006.01)

(52) U.S. Cl.
CPC ........... *A61J 1/1412* (2013.01); *A61J 1/1406* (2013.01); *B65D 51/002* (2013.01)

(58) Field of Classification Search
CPC ...... A61J 1/1412; A61J 1/1406; B65D 51/002
See application file for complete search history.

(56) References Cited

U.S. PATENT DOCUMENTS 3,439,825 A * 4/1969 Glensky ................ B65D 41/42 215/251
3,653,528 A 4/1972 Wimmer
(Continued)

FOREIGN PATENT DOCUMENTS

CA 3138450 A1 11/2020
CN 1759043 A 4/2006
(Continued)

OTHER PUBLICATIONS

English Translation of Specification for DE4446182A1. (Year: 1996).*
(Continued)

*Primary Examiner* — Ariana Zimbouski
(74) *Attorney, Agent, or Firm* — Chandra J. Duncan

(57) ABSTRACT

A sealed pharmaceutical container includes a shoulder, a neck extending from the shoulder, a flange extending from the neck, and a sealing assembly. The flange includes an underside surface extending from the neck, an outer surface extending from the underside surface, the outer surface defining an outer diameter of the flange, and an upper sealing surface extending between the outer surface and an inner surface defining an opening in the sealed pharmaceutical container. The sealing assembly includes a stopper and a metal-containing cap securing the stopper to the flange. The stopper includes a sealing portion extending over the upper sealing surface of the flange and covering the opening, and a rim extending at least partially along the outer surface of the flange.

8 Claims, 3 Drawing Sheets

(56) References Cited

U.S. PATENT DOCUMENTS

| | | | |
|---|---|---|---|
| 3,659,736 A | 5/1972 | Illinois | |
| 4,089,432 A | 5/1978 | Crankshaw et al. | |
| 4,205,754 A | 6/1980 | Jarsskov et al. | |
| 4,244,478 A | 1/1981 | Handman | |
| 4,664,277 A | 5/1987 | Connor | |
| 5,064,083 A | 11/1991 | Alexander et al. | |
| 5,772,057 A | 6/1998 | Finneran | |
| 5,803,284 A | 9/1998 | Grimard | |
| 5,817,082 A | 10/1998 | Niedospial, Jr. et al. | |
| 5,902,298 A | 5/1999 | Niedospial et al. | |
| 6,090,093 A * | 7/2000 | Thibault | A61J 1/2089 215/253 |
| 6,602,206 B1 | 8/2003 | Niermann et al. | |
| 6,645,635 B2 | 11/2003 | Muraki | |
| 7,282,269 B2 | 10/2007 | Wang et al. | |
| 8,092,878 B2 | 1/2012 | Miller et al. | |
| 8,497,004 B2 | 7/2013 | Davis et al. | |
| 8,544,665 B2 | 10/2013 | Bogle et al. | |
| 8,551,898 B2 | 10/2013 | Danielson et al. | |
| 8,684,206 B2 | 4/2014 | Kawachi | |
| 9,080,044 B2 | 7/2015 | Muto | |
| 9,145,329 B2 | 9/2015 | Drake et al. | |
| 9,744,099 B2 | 8/2017 | Fadeev et al. | |
| 9,763,852 B2 | 9/2017 | Fadeev et al. | |
| 10,273,049 B2 | 4/2019 | Adib et al. | |
| 10,450,214 B2 | 10/2019 | McEnroe et al. | |
| 10,780,021 B2 | 9/2020 | Weikart et al. | |
| 11,014,701 B2 | 5/2021 | Langsdorf et al. | |
| 11,168,019 B2 | 11/2021 | Schaut et al. | |
| 11,613,396 B2 | 3/2023 | Langsdorf et al. | |
| 11,707,412 B2 | 7/2023 | Frost et al. | |
| 2002/0023409 A1 | 2/2002 | Py | |
| 2002/0166326 A1 | 11/2002 | Giesy et al. | |
| 2003/0177629 A1 | 9/2003 | Thibault et al. | |
| 2004/0217081 A1 | 11/2004 | Konrad | |
| 2007/0010700 A1 | 1/2007 | Bensmann et al. | |
| 2007/0102393 A1 | 5/2007 | Colin et al. | |
| 2007/0246468 A1 | 10/2007 | Miller et al. | |
| 2009/0145427 A1 | 6/2009 | Groeger et al. | |
| 2010/0236659 A1 | 9/2010 | Py et al. | |
| 2010/0273049 A1 | 10/2010 | Vidal et al. | |
| 2014/0034544 A1 | 2/2014 | Chang et al. | |
| 2015/0211950 A1* | 7/2015 | Eckhoff | B65B 7/2821 702/50 |
| 2015/0344557 A1 | 12/2015 | Malik et al. | |
| 2016/0009460 A1 | 1/2016 | Fournier et al. | |
| 2016/0075485 A1 | 3/2016 | Masuyama et al. | |
| 2016/0324723 A1 | 11/2016 | Lippert et al. | |
| 2018/0257975 A1 | 9/2018 | Kimura et al. | |
| 2020/0146280 A1 | 5/2020 | Silverman et al. | |
| 2020/0156991 A1 | 5/2020 | Allington et al. | |
| 2020/0271541 A1 | 8/2020 | Mathaes et al. | |
| 2021/0000690 A1 | 1/2021 | Langsdorf et al. | |
| 2021/0002016 A1 | 1/2021 | Langsdorf et al. | |
| 2021/0080448 A1 | 3/2021 | Murphy et al. | |
| 2021/0212893 A1 | 7/2021 | Christie et al. | |
| 2022/0048804 A1 | 2/2022 | Barnard et al. | |
| 2022/0168185 A1 | 6/2022 | Redkar et al. | |
| 2022/0339067 A1 | 10/2022 | Christie et al. | |
| 2023/0278745 A1 | 9/2023 | Langsdorf et al. | |

FOREIGN PATENT DOCUMENTS

| | | | | |
|---|---|---|---|---|
| CN | 101287553 A | 10/2008 | |
| CN | 111867994 A | 10/2020 | |
| CN | 213503307 U | 6/2021 | |
| DE | 4446182 A1 * | 6/1996 | B65D 51/002 |
| EP | 0267433 A2 | 5/1988 | |
| EP | 3708137 A1 | 9/2020 | |
| FR | 0484903 A | 11/1917 | |
| FR | 2558444 A1 | 7/1985 | |
| JP | 09-140769 A | 6/1997 | |
| JP | 10-179688 A | 7/1998 | |
| JP | 2002-065811 A | 3/2002 | |
| JP | 2002-512084 A | 4/2002 | |
| JP | 2008-520522 A | 6/2008 | |
| JP | 2010-209157 A | 9/2010 | |
| JP | 2016-504258 A | 2/2016 | |
| JP | 2018-008738 A | 1/2018 | |
| JP | 2021-010734 A | 2/2021 | |
| WO | WO-2013034594 A1 * | 3/2013 | B65D 51/20 |
| WO | 2019/213746 A1 | 11/2019 | |
| WO | WO-2020112634 A1 * | 6/2020 | G01M 3/226 |
| WO | 2020/231474 A2 | 11/2020 | |
| WO | 2021/042090 A2 | 3/2021 | |
| WO | 2021/162984 A1 | 8/2021 | |
| WO | 2022/020120 A1 | 1/2022 | |
| WO | 2023/034088 A1 | 3/2023 | |

OTHER PUBLICATIONS

Ethylene-Propylene Rubbers & Elastomers, Apr. 20, 2012, International Institute of Synthetic Rubber Producers, Inc. (Year: 2012).*

"Circular Rings and Arches", Retrieved from: https://engineeringlibrary.org/reference/circular-rings-arches-air-force-stress-manual, 1986, 15 pages.

"Emission Factors for Greenhouse Gas Inventories", Retrieved from: https://www.epa.gov/sites/default/files/2018-03/documents/emission-factors_mar_2018_0.pdf, 2018, 5 pages.

"How Much Does an Empty Semi Trailer Weigh?", Retrived from: https://bigrigpros.com/how-much-does-an-empty-semi-trailer-weigh/, 2023, 5 pages.

Invitation to Pay Additional Fees and, Where Applicable, Protest Fee; PCT/US22/48348; dated Jan. 5, 2023, 10 pages; European Patent Office.

Shigley and Mitchell, Mechanical Engineering Design 4th edition, 1985, 6 pages.

U.S. Appl. No. 63/277,488, "Pharmaceutical Containers Including High CTE Sealing Assembly Encircling Outer Surface of Container," filed Nov. 9, 2021.

International Search Report and Written Opinion of the International Searching Authority; PCT/US2024/029817; dated Sep. 25, 2024; 12 pages; European Patent Office.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

Brigitte Zuleger et al., Container/Closure Integrity Testing and the Identification of a Suitable Vial/Stopper Combination for Low-Temperature Storage at −80° C., 2012, PDA JPST, vol. 66, Abstract (Year: 2012).

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Hagart-Alexander, C., Temperature Measurement, 2010, Elsevier Inc., pp. 269-271 (Year: 2010).

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

Mathaes, R., et al. (2016). "The pharmaceutical vial capping process: Container closure systems, capping equipment, regulatory framework, and seal quality tests", Elsevier, Eur J Pharm Biopharm 99 (2016) 54-64. DOI: http:/dx.doi.org/10.1016/j.ejpb.2015.11.016.

Nieto, A. and H. Roehl (2018). "Sealing Behaviour of Container Closure Systems under Frozen Storage Conditions: Nonlinear Finite Element Simulation of Serum Rubber Stoppers." PDA J Pharm Sci and Tech (2018), 72(4): 367-381. DOI: 10.5731/pdajpst.2017.008391.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

(56) References Cited

OTHER PUBLICATIONS

International Search Report and Written Opinion of the International Searching Authority; PCT/US22/41311; mailed on Nov. 22, 2022, 14 pages; European Patent Office.
Kramer, "<1207> Package Integrity Evaluation—Sterile Products", Retrieved from: http://www.njccwei.com/uploadfiles/2024/01/20240103144252884.pdf, Aug. 1, 2016, 7 pages.
"Aluminum, Al", MatWeb, Retrieved from; https://www.matweb.com/search/DataSheet.aspx?MatGUID=0cd1edf33ac145ee93a0aa6fc666c0e0, 2017, 3 pages.
"Overview of Materials for Silicone Rubber", MatWeb, Retrieved from: https://www.matweb.com/search/DataSheet.aspx?MatGUID=cbe7a469897a47eda563816c86a73520 , Dec. 2017, 4 pages.
Melito, "Seal Selection and Thermal Exapansion", Elasto Proxy, Retrieved from: https://www.elastoproxy.com/seal-selection-and-thermal-expansion, 2013, 3 pages.
Zhao et al., "Study on Optimization of Damping Performance and Damping Temperature Range of Silicone Rubber by Polyborosiloxane Gel", Polymers, 2020, 13 pages.

* cited by examiner

PHARMACEUTICAL CONTAINERS INCLUDING HIGH CTE SEALING ASSEMBLY ENCIRCLING OUTER SURFACE OF CONTAINER

This application claims the benefit of priority under 35 U.S.C. § 119 of U.S. Provisional Application Ser. No. 63/277,488 filed on Nov. 9, 2021, the content of which is relied upon and incorporated herein by reference in its entirety.

TECHNICAL FIELD

The present specification generally relates to containers, such as glass containers for storing pharmaceutical compositions and, more particularly, glass containers including a sealing assembly formed from a material having a high coefficient of thermal expansion to improve sealing when subjected to relatively low temperatures.

BACKGROUND

Pharmaceutical containers, such as vials and syringes, are typically sealed via a stopper or other closure to preserve the integrity of the contained material. Closures are typically made of synthetic rubbers and other elastomers. Such materials beneficially have high permeation resistance and elasticity to facilitate insertion into the container to seal the container's interior. The elasticity of typically-used closure materials, however, may reduce at low temperatures. For example, synthetic rubbers currently in use as material closures may comprise transition temperatures that are greater than or equal to −70° C. and less than or equal to −10° C. Below the transition temperature, closures constructed of such synthetic rubbers may behave as a solid and be unable to expand elastically to compensate for the relatively large difference between coefficients of thermal expansion of the glass and a crimping cap used to secure the closure to the container. Given this, existing sealing assemblies for pharmaceutical containers may fail at temperatures less than or equal to −20° C.

Some biological materials (e.g., blood, serum, proteins, stem cells, and other perishable biological fluids) require storage at temperatures below the glass transition temperatures of conventional elastomers to remain useful. For example, certain RNA-based vaccines may require storage at dry-ice temperatures (e.g., approximately −80° C.) or liquid nitrogen temperatures (e.g., approximately −180° C.) to remain active. Such low temperatures may result in dimensional changes in the closure components (e.g., the glass or plastic container, the stopper, an aluminium cap), leading to issues in the integrity of the seal, and potential contamination of the material stored therein.

SUMMARY

In one embodiment, a sealed pharmaceutical container includes: a shoulder; a neck extending from the shoulder; a flange extending from the neck, the flange including: an underside surface extending from the neck; an outer surface extending from the underside surface, the outer surface defining an outer diameter of the flange; and an upper sealing surface extending between the outer surface and an inner surface defining an opening in the sealed pharmaceutical container, and a sealing assembly including: a stopper including a sealing portion extending over the upper sealing surface of the flange and covering the opening, and a rim extending at least partially along the outer surface of the flange; and a metal-containing cap securing the stopper to the flange.

In another embodiment, a sealed pharmaceutical container includes: a shoulder; a neck extending from the shoulder; a flange extending from the neck; an inner surface defining an opening extending through the neck and the flange, wherein the flange includes an upper sealing surface extending from the inner surface and an outer surface extending from the upper sealing surface; and a sealing assembly including: a stopper including a sealing portion extending over the upper sealing surface of the flange and covering the opening, and a rim extending at least partially along the outer surface of the flange; and a metal-containing cap crimped to the flange, the metal-containing cap compressing the stopper against the upper sealing surface.

In yet another embodiment, a method of sealing a pharmaceutical container includes: providing a pharmaceutical container including a shoulder, a neck extending from the shoulder and a flange extending from the neck, the flange including: an underside surface extending from the neck; an outer surface extending from the underside surface, the outer surface defining an outer diameter of the flange; and an upper sealing surface extending between the outer surface to an inner surface of the pharmaceutical container that defines an opening; inserting a pharmaceutical composition into the pharmaceutical container; providing a stopper including a sealing portion extending over the upper sealing surface of the flange and covering the opening, and a rim extending at least partially along the outer surface of the flange; and crimping a metal-containing cap over the stopper and against flange to compress the stopper against the upper sealing surface.

In yet another embodiment, a sealed pharmaceutical container includes: a shoulder; a neck extending from the shoulder; and a flange extending from the neck, the flange includes: an underside surface extending from the neck; an outer surface extending from the underside surface, the outer surface defining an outer diameter of the flange; and an upper sealing surface extending between the outer surface and an inner surface defining an opening in the sealed pharmaceutical container, wherein a cutout portion is formed in the outer surface of the flange extending in an inward radial direction.

a method of sealing a sealed pharmaceutical container includes: providing a sealed pharmaceutical container including a shoulder, a neck extending from the shoulder and a flange extending from the neck, the flange including: an underside surface extending from the neck; an outer surface extending from the underside surface, the outer surface defining an outer diameter of the flange; and an upper sealing surface extending between the outer surface to an inner surface of the sealed pharmaceutical container that defines an opening; inserting a pharmaceutical composition into the sealed pharmaceutical container; providing a stopper including a sealing portion extending over the upper sealing surface of the flange and covering the opening, and a rim extending at least partially along the outer surface of the flange; and crimping a metal-containing cap over the stopper and against flange to compress the stopper against the upper sealing surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
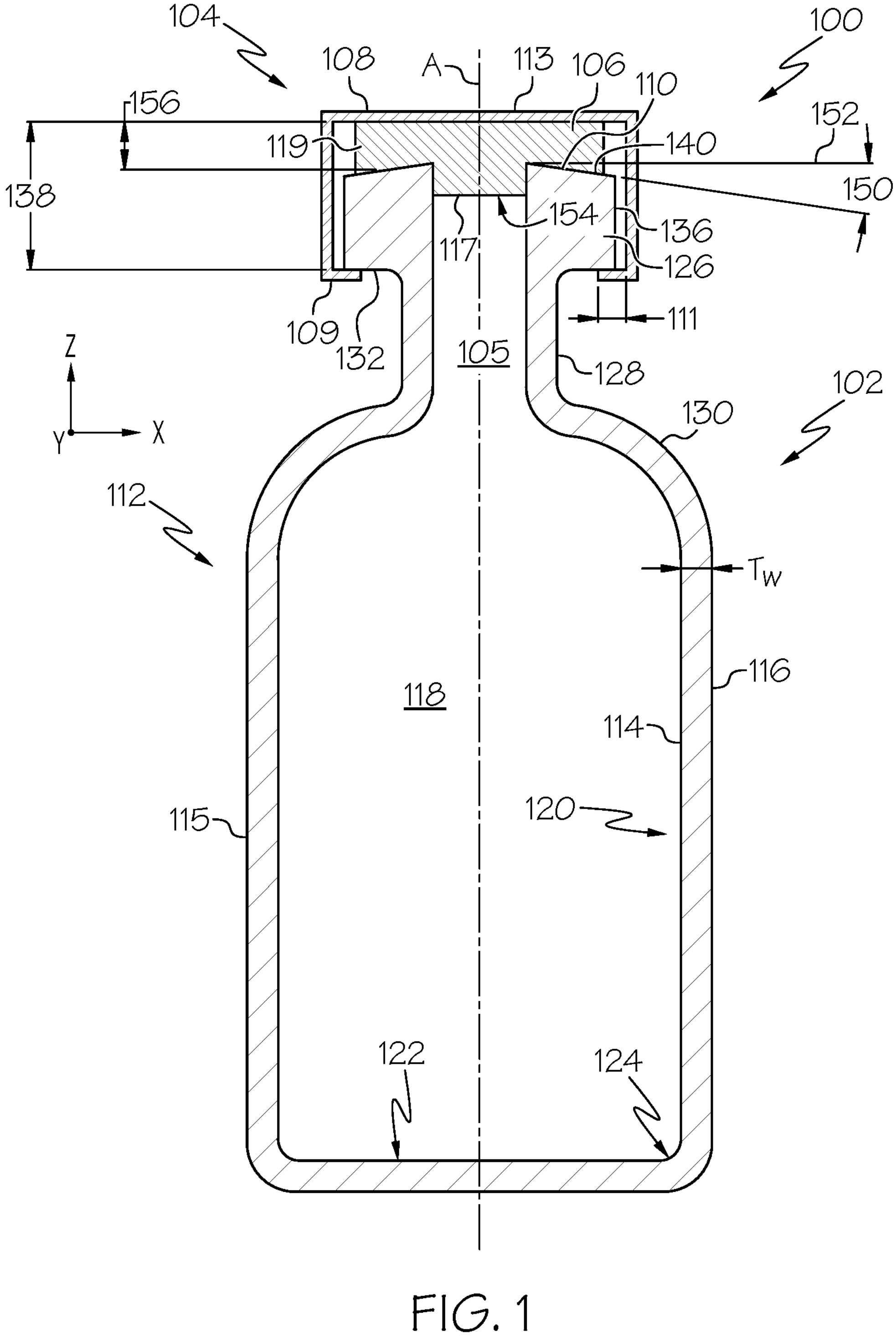
FIG. 1 schematically depicts a cross-sectional view of an embodiment of a pharmaceutical container, according to one or more embodiments shown and described herein.

Reference will now be made in detail to embodiments of sealed pharmaceutical containers including sealing assemblies that maintain container closure integrity at relatively low storage temperatures (e.g., less than or equal to −30° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., less than or equal to −180° C.). In embodiments, the structure of the pharmaceutical containers described herein may vary from that of existing pharmaceutical containers in one or more respects to facilitate the maintenance of a seal at an interface between the pharmaceutical containers and a sealing assembly inserted therein. For example, embodiments of the pharmaceutical containers described herein may be vials (though other container shapes are within the scope of the present disclosure) including a shoulder, a neck, and a flange including an upper sealing surface against which a stopper of a sealing assembly is pressed by a cap. Various characteristics of the upper sealing surface may be adapted to facilitate the maintenance of a seal when the sealed pharmaceutical containers are cooled to such low storage temperatures. For example, in embodiments, the upper sealing surface may include an inclined sealing surface that descends with increasing radial distance from a central axis of the pharmaceutical container. The inclined sealing surface may descend at an angle of equal to or greater than 0 degrees (e.g., greater than 0 degrees and less than or equal to 45 degrees) relative to a plane extending over an end of the pharmaceutical container so as to increase an initial force against the stopper applied during a crimping process and increase tolerance for stopper shrinkage when cooled to lower temperatures. In embodiments, the upper sealing surface extends perpendicular to the central axis of the pharmaceutical container (e.g., extends at an angle of greater than or equal 90 degrees and less than or equal to 89.5 degrees) to maximize a contact area between the upper sealing surface and the stopper. In embodiments, various other characteristics of the upper sealing surface (e.g., surface roughness, flatness, and the like) may be tailored to increase the sealing integrity.

In embodiments, the sealing assembly of the pharmaceutical containers described herein may be formed of various combinations of materials to facilitate seal maintenance at low storage temperatures. Sealing assemblies of the present specification may include a stopper and a metal-containing cap formed from compositions tailored to prevent excessive deformation of the stopper relative to the metal-containing cap at low storage temperatures to maintain sufficient sealing force applied to the stopper via the metal-containing cap. For example, in embodiments, the metal-containing cap may be constructed of a material that increases the CTE thereof over existing, aluminum crimping caps. In embodiments, the metal-containing cap may be constructed of at least one of Zn or Mg instead of Al to provide a higher CTE. In embodiments, the metal-containing cap is constructed of an aluminum-containing polymer composite material. In embodiments, the metal-containing cap is constructed of a metallic alloy comprising at least one of Zn, Al, Mg, Cu. In embodiments, the stopper is constructed of a material having a lower CTE than existing pure rubber stoppers. For example, in embodiments, the stopper may be constructed of a polymer composite comprising greater than 0 wt. % and less than or equal to 30 wt. % of a silicon-based filler material. The silicon-based filler material may comprise SiO2 glass particles or various silicates (e.g., cordierite, b-eucryptite, b-spodumene) or combinations thereof. The CTE of the stopper may be less than or equal to $290\times10^{-7}$/K to reduce shrinkage thereof at low storage temperatures.

As used herein, the term "container closure integrity" refers to maintenance of a seal at an interface between a pharmaceutical container and a sealing assembly (e.g., between an upper sealing surface of a pharmaceutical container and a stopper) that is free of gaps above a threshold size to maintain a probability of contaminant ingress or reduce the possibility of gas permeability below a predetermined threshold based on the material stored in a pharmaceutical container. For example, in embodiments, a container closure integrity is maintained if a helium leakage rate during a helium leak test described in USP <1207> (2016) is maintained at less than or equal to $1.4\times10^{-6}$ $cm^3/s$.

In the embodiments of the pharmaceutical containers described herein, the concentration of constituent components (e.g., SiO2, $Al_2O_3$, $B_2O_3$ and the like) of the glass composition from which the pharmaceutical containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "CTE," as used herein, refers to the coefficient of thermal expansion over a temperature range from about −200° C. to about 300° C., unless stated otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, one embodiment of a pharmaceutical container 100 for storing a pharmaceutical formulation is schematically depicted in cross section. The pharmaceutical container 100 includes a glass container 102 and a sealing assembly 104 coupled to the glass container 102 at an opening 105 of the glass container 102. The sealing assembly 104 includes a stopper 106 and a metal-containing cap 108. In the embodiment depicted in FIG. 1, the stopper 106 comprises an insertion portion 117 and a sealing portion 119. The insertion portion 117 is inserted into the opening 105 of the glass container 102 until the sealing portion 119 contacts an upper sealing surface 110 of the glass container 102. The sealing portion 119 is then pressed against the upper sealing surface 110 via crimping of the metal-containing cap 108 to form a seal at the upper sealing surface 110. Various aspects of the glass container 102 and the sealing assembly 104 are designed to ensure maintenance of container closure integrity of the glass container 102 at low storage temperatures, as described herein. As discussed in more detail herein, it should be appreciated that the CTE of the stopper is equal to or greater than a CTE of the flange, which may be formed from a glass, ceramic, polymer, metal, or the like.

The glass container 102 generally comprises a body 112. The body 112 has a wall thickness TW which extends between an inner surface 114 and an outer surface 116 of the glass container 102, includes a central axis A, and generally encloses an interior volume 118. In the embodiment of the glass container 102 shown in FIG. 1, the body 112 generally includes a wall portion 120 and a floor portion 122. The wall portion 120 transitions into the floor portion 122 through a heel portion 124. In the depicted embodiment, the wall portion 120 of the glass container 102 defines a flange 126, a neck 128 extending from the flange 126, a barrel 115, and a shoulder 130 extending between the neck 128 and the barrel 115. The floor portion 122 is coupled to the barrel 115 via the heel portion 124. In embodiments, the glass container 102 is symmetrical about the central axis A, with each of the barrel 115, the neck 128, and the flange 126 being substantially cylindrical-shaped.

In embodiments, the glass container 102 may be formed from Type I, Type II, or Type III glass as defined in USP <660>, including borosilicate glass compositions such as Type 1B borosilicate glass compositions under USP <660>. Alternatively, the glass container 102 may be formed from alkali aluminosilicate glass compositions such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 102 may be constructed from a soda lime glass composition. In embodiments, the glass container 102 is constructed of a glass composition having a coefficient of thermal expansion that is greater than or equal to $0\times10^{-7}$/K and less than or equal to $100\times10^{-7}$/K (e.g., greater than or equal to $30\times10^{-7}$/K and less than or equal to $70\times10^{-7}$/K).

While the glass container 102 is depicted in FIG. 1 as having a specific form-factor (i.e., a vial), it should be understood that the glass container 102 may have other form factors, including, without limitation, Vacutainers*, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

Although referred to herein as a glass container 102, it should be appreciated that the glass container 102 may be formed of a material other than glass such as, for example, a polymer, metal, ceramic, and the like. Further, the coefficient of thermal expansion of these materials can be greater than or equal to $0\times10^{-7}$/K and less than or equal to $8{,}000\times10^{-7}$/K.

The wall thickness TW of the glass container 102 may vary depending on the implementation. In embodiments, the wall thickness TW of the glass container 102 may be from less than or equal to 6 millimeters (mm), such as less than or equal to 4 mm, less than or equal to 2 mm, less than or equal to 1.5 mm, or less than or equal to 1 mm. In some embodiments, the wall thickness Tw may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness TW may be greater than or equal to 0.9 mm and less than or equal to 1.8 mm. The wall thickness TW may vary depending on the axial location within the glass container 102.

As depicted in FIG. 1, the flange 126 comprises an underside surface 132, an outer surface 136, and the upper sealing surface 110. The outer surface 136 may define an outer diameter of the flange 126. In embodiments, the metal-containing cap 108 of the sealing assembly 104 is crimped around the flange 126 via any suitable crimping method (e.g., a pneumatic crimping apparatus or the like). During the sealing process, the stopper 106 is inserted into the opening 105, and a compression force is applied to the metal-containing cap 108 during crimping. For example, as depicted in FIG. 1, the metal-containing cap 108 includes an underlying portion 109 that contacts the underside surface 132 of the flange 126 to force the stopper 106 to remain in a compressed state and form a seal after the crimping process. Compression of the stopper 106 generates a residual sealing force within the flange 126 that maintains compression on the stopper 106 after the metal-containing cap 108 is crimped into place. In embodiments, the length of the underlying portion 109 of the metal-containing cap 108 that directly contacts the underside surface 132 of the flange 126 possesses a length 111 (e.g., in the X-direction depicted in FIG. 1) that is greater than or equal to 1 mm to facilitate maintenance of residual sealing force within the stopper 106 at storage temperatures of less than or equal to −80° C.

When the pharmaceutical container 100 is cooled to relatively low storage temperatures of less than or equal to −30° C. (e.g., less than or equal to −30° C., less than or equal to −80° C., less than or equal to −100° C., less than or equal to −125° C., less than or equal to −150° C., less than or equal to −175° C., −180° C.), each of the constituent components of the pharmaceutical container 100 may undergo a volumetric shrinkage that is dependent on the thermal properties of that component. As depicted in FIG. 1, the volume of material disposed between the underlying portion 109 and an upper portion 113 of the metal-containing cap 108 circumscribes the sealing portion 119 of the stopper 106 and the flange 126 of the glass container 102. If the combination of the stopper 106 and the flange 126 shrinks in an amount that is greater than the amount of shrinkage of the metal-containing cap 108, the compression on the stopper 106 provided by the metal-containing cap 108 may diminish, increasing the probability of the seal at the upper sealing surface 110 being broken.

For example, as depicted in FIG. 1, the combined height 138 (e.g., in the Z-direction depicted in FIG. 1) of the flange 126 and the stopper 106 is approximately equal to the distance between the upper portion 113 and the underlying portion 109 of the metal-containing cap 108. In such a state, the metal-containing cap 108 may compress the stopper 106 against the upper sealing surface 110 to form a seal. If the combined height 138 shrinks to a greater extent than the metal-containing cap 108, however, the compression of the stopper 106 may diminish, reducing the residual seal force. To maintain a compression of the stopper 106, shrinkage ΔL of the metal-containing cap 108, the stopper 106, and the glass container 102 may satisfy the following relation:

$$\Delta L_{cap} = \Delta L_{vial} + \Delta L_{stopper} \tag{1}$$

where the shrinkage of ΔL of each component may be approximated by $$\Delta L = L_i x\left(e^{\int \alpha(T)} - 1\right), \tag{2}$$

where $L_i$ is an initial dimension of the component and $\alpha^{(T)}$ is the temperature-dependent CTE of the material out of which each of the metal-containing cap 108, the stopper 106, and the glass container 102 are constructed.

In embodiments, the stopper 106 is constructed of a polymer-based material (e.g., butyl or other synthetic rubbers). Such materials may comprise a glass transition temperature ($T_g$) that is greater than or equal to −70° C. and less than or equal to −10° C. Such materials may comprise a glass transition temperature ($T_g$) that is less than or equal to −20° C. Below the $T_g$, the stopper 106 may behave as a glassy solid (e.g., lose its shape recover ability), resulting in a diminished sealing force at the upper sealing surface 110. For example, if the stopper 106 is cooled to beneath its $T_g$, the stopper 106 may not fill the entirety of the gap between the upper sealing surface 110 and the upper portion 113 of the metal-containing cap 108, increasing the probability of the seal breaking. That is, the stopper 106 effectively behaves as two different materials as it is cooled below its glass transition temperature: a hyperelastic material above the transition temperature, and a solid glass below the transition temperature. According to equation 2 herein, the shrinkage of the stopper 106 disposed between the flange 126 and the upper portion 113 of the metal-containing cap 108 when cooled from an initial temperature Ti to a final temperature TF may be approximated as:

$$\Delta L_{stopper} = L_{i,stopper} x\left(e^{\int_{T_i}^{T_g} \alpha_{rubber}(T)dT + \int_{T}^{T_F} \alpha_{glass}(T)dT} - 1\right), \tag{3}$$

where $\alpha_{glass}$ refers to the CTE of the glass-like material that the rubber of the stopper 106 transforms into below its glass transition temperature $T_g$. In embodiments, to maintain the seal, the metal-containing cap 108 and stopper 106 may be constructed such that the shrinkage of the metal-containing cap 108 is greater than or equal to the combined shrinkage of the glass container 102 and the stopper 106. To facilitate meeting such a relationship, the shrinkage of the metal-containing cap 108 may be increased, the shrinkage of the stopper 106 and flange 126 may be decreased, or any combination thereof. Alternatively or additionally, the structure of the glass container 102 may be designed to increase an initial capping compression imparted on the stopper 106, thereby providing a greater tolerance for shrinkage of the stopper 106.

In embodiments, the metal-containing cap 108 is constructed of aluminium, which may have a CTE of approximately $240\times10^{-7}$/K. Typical rubbers out of which the stopper 106 is constructed (e.g., Butyl 325, Butyl 035, etc.) may have CTEs of greater than or equal to $1{,}000\times10^{-7}$/K. That is, purely in terms of CTE differential, the metal-containing cap 108 has a tendency to shrink less than the stopper 106, resulting in a diminished sealing force at lower storage temperature. In addition to the above-described CTE mismatch, as depicted in FIG. 1, the stopper 106 may make up a larger volumetric percentage of the sealing assembly 104 than the metal-containing cap 108, further compounding the tendency of the stopper 106 to undergo a larger thermal shrinkage.

In the embodiment depicted in FIG. 1, to counteract such tendencies of the stopper shrinkage to overwhelm the shrinkage of the metal-containing cap 108 at low storage temperatures, the structure of the glass container 102 has been modified to deviate from existing glass containers to provide greater compression of the stopper 106 during the process of crimping the metal-containing cap 108. Specifically, in embodiments, the upper sealing surface 110 includes an inclined sealing surface 140, such as that disclosed in U.S. Patent Application Publication No. 2021/0212893, hereby incorporated by reference in its entirety. The inclined sealing surface 140 extends between the outer surface 136 of the flange 126 and the inner surface 114 of the glass container 102. The inclined sealing surface 140 extends at an angle 150 to a plane 152 extending through an end 154 of the opening 105. The plane 152 may be a planar surface that rests on top of the glass container 102 at the opening 105 (e.g., that rests on peaks of the inclined sealing surface 140). In embodiments, the plane 152 connects points extending around the upper sealing surface 110 that are most distant from a reference point (e.g., the floor portion 122, see FIG. 1) of the glass container 102. The plane 152 may extend through the top of the glass container 102 in a direction perpendicular to the central axis A of the glass container 102 (e.g., in the X-direction depicted in FIG. 1). In embodiments, the plane 152 extends perpendicular to the portion of the inner surface 114 defining the opening 105.

The angle 150, as described herein, may be referred to as a “flange angle.” Flange angles relative to the plane 152 may be measured in a variety of different ways. For example, in embodiments, to determine an extension direction for the inclined sealing surface 140, an image may be captured of the glass container 102, and image processing techniques may be used to determine the angle 150 of the inclined sealing surface 140 (relative to the plane 152). In embodiments, the extension direction of the inclined sealing surface 140 is measured via finding a plane that extends between a peak of the inclined sealing surface 140 (e.g., having the greatest distance in the Z-direction from the underside surface 132) and a second highest point on the inclined sealing surface 140 (e.g., the extension direction of the inclined sealing surface 140 is measured via a plane that rests on the peak of the inclined sealing surface 140 and another point of the inclined sealing surface 140 that is lower than the peak relative to the plane 152). In embodiments, the extension direction of the inclined sealing surface 140 is measured via connecting points on the inclined sealing surface 140 that are a predetermined distance (e.g., 0.1 mm, 0.2 mm, 0.5 mm, 1.0 mm, etc.) outward from the inner surface 114 and inward of the outer surface 136 (e.g., the points may be taken at a uniform distribution of spatial points extending between the inner surface 114 and the outer surface 136). In embodiments, the extension direction of the inclined sealing surface 140 is measured by curve fitting a linear plane to a plurality of different points distributed throughout the entirety of the inclined sealing surface 140.

In embodiments, the angle 150 is greater than 0 degrees and less than or equal to 45 degrees (e.g., greater than 0 degrees and less than or equal to 40 degrees, greater than 0 degrees and less than or equal to 40 degrees, greater than 0 degrees and less than or equal to 30 degrees, greater than 0 degrees and less than or equal to 20 degrees, and greater than 0 degrees and less than or equal to 10 degrees). In embodiments, the angle 150 is substantially uniform around a circumference of the glass container 102 (e.g., when measured at a plurality of azimuthal orientations, each of the measurements may be within 0.5 degrees of one another). In existing glass containers, the angle 150 is typically around 3 degrees. As such, in the glass container 102, the inclination of the upper sealing surface 110 relative to the plane 152 is increased by at least 50% over existing glass containers. The greater inclination of the upper sealing surface 110 tends to increase stopper compression at low storage temperatures. The angle 150 may create a compression gradient within the stopper 106 as a result of crimping the metal-containing cap 108. For example, in embodiments, a compression of the stopper 106 may increase with increasing radial distance from the outer surface 136 such that the compression of the stopper 106 is greater closer to the inner surface 114. Such greater compression with proximity to the inner surface 114 may prevent gaps from forming in the seal as the stopper 106 shrinks with cooling.

Referring to FIG. 1, as a result of the angle 150, a distance 156 between the upper portion 113 of the metal-containing cap 108 and the upper sealing surface 110 may vary as a function of radial distance from the central axis A to a greater extent than existing glass containers. Given this, the stopper 106 is compressed to a greater extent proximate to the opening 105 than at peripheral regions of the stopper 106 disposed near the outer surface 136 of the flange 126. Such greater compression results in a greater compression of the stopper 106 using the same crimping process, providing a higher tolerance for shrinkage of the stopper 106. Additionally, the inclined sealing surface 140 reduces the term $L_{i,stopper}$ in equation 3 above proximate to the opening 105. This reduces the amount of shrinkage.

Although not illustrated herein, it should be understood that alternatives to the glass container 102 described herein with respect to FIG. 1 may be used while still maintaining container closure integrity at storage temperatures less than or equal to −80° C. For example, the upper sealing surface 110 may extend in the plane 152 extending through the end 154 of the opening 105 in the glass container 102. In embodiments, the upper sealing surface 110 extends substantially perpendicular (e.g., at an angle greater than or equal to 89.5 degrees and less than or equal to 90.5 degrees) to the central axis A of the glass container 102. In embodiments, the upper sealing surface 110 extends substantially perpendicular to the inner surface 114 of the glass container 102 defining the opening 105. Such an upper sealing surface 110 beneficially increases a contact area between the stopper 106 and the upper sealing surface 110 and may increase the probability of maintaining integrity of the seal.

Figure 2:
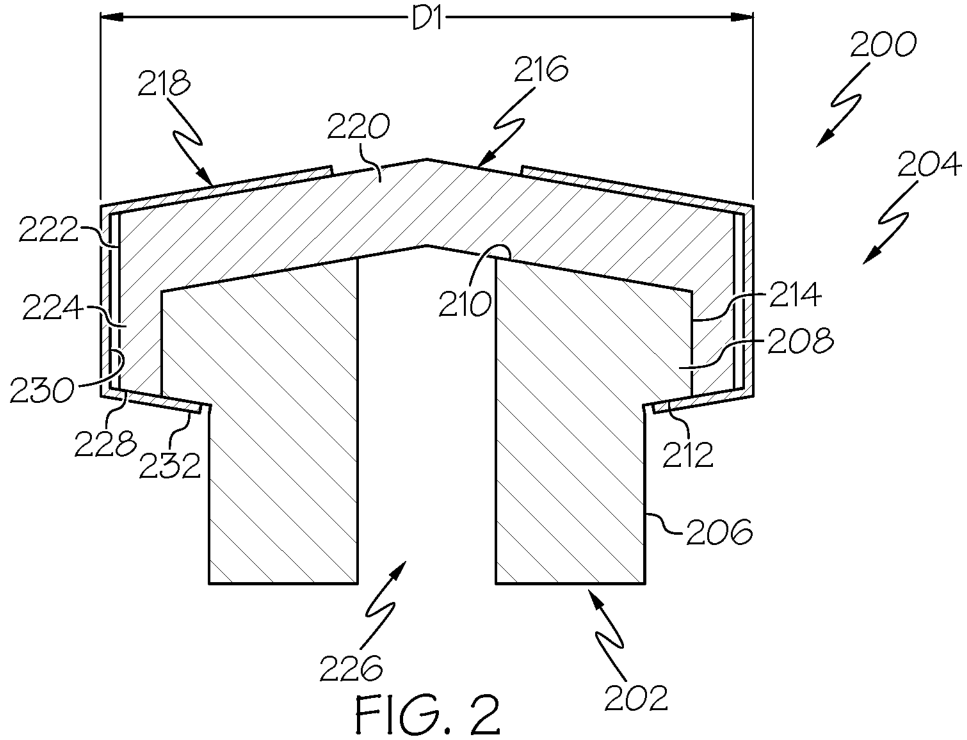
FIG. 2 schematically depicts a partial cross-sectional view of another embodiment of a pharmaceutical container, according to one or more embodiments shown and described herein.

Referring now to FIG. 2, a further embodiment of a pharmaceutical container 200 is illustrated including a glass container 202 and a sealing assembly 204. Although not described in detail herein, the glass container 202 and the sealing assembly 204 may include similar structure and features to the glass container 102 and the sealing assembly 104 described herein and illustrated FIG. 1. As shown in FIG. 2, the glass container 202 includes a neck 206 extending to a flange 208 defined by an upper sealing surface 210, an underside surface 212, and an outer surface 214.

In embodiments, the sealing assembly 204 includes a stopper 216 and a metal-containing cap 218. However, it should be appreciated that, in embodiments, the metal-containing cap 218 may not be provided. The stopper 216 includes a sealing portion 220 terminating at an outer edge 222 and a rim 224 extending from the outer edge 222 of the sealing portion 220. In embodiments, the rim 224 may contact or not contact the metal-containing cap 218. The sealing portion 220 has an outer diameter D1 defined by a distance between the outer edge 222 of the sealing portion 220. The outer diameter D1 may be equal to or less than a diameter between the inner surface 230 of the metal-containing cap 218. When the stopper 216 is positioned on the glass container 202, the sealing portion 220 extends over the upper sealing surface 210 of the flange 208 and covers an opening 226 formed in the glass container 202. The rim 224 extends from the outer edge 222 of the sealing portion 220 and at least partially along the outer surface 214 of the flange 208. In embodiments, as shown in FIG. 2, the rim 224 has a length extending along an entire length or partial length of the outer surface 214 of the flange 208. In embodiments, a bottom surface 228 of the rim 224 extends collinear with the underside surface 212 of the flange 208. In embodiments in which the metal-containing cap 218 is provided, the bottom surface 228 of the rim 224 may contact the inner surface 230 of the metal-containing cap 218, specifically, an underlying portion 232 of the metal-containing cap 218, which extends radially inwardly along the underside surface 212 of the flange 208 and toward to the neck 206.

It should be appreciated that when the pharmaceutical container 200 is subjected to relatively low storage temperatures, as discussed above, the coefficient of thermal expansion of the stopper 216 being greater than the coefficient of thermal expansion of the glass container 202 causes the rim 224 of the stopper 216 to shrink around and toward the flange 208 of the glass container 202, thus increasing the seal formed between the stopper 216 and the flange 208 of the glass container 202. More particularly, the sealing portion 220 of the stopper 216 shrinks during relatively low storage temperatures such that the outer diameter D1 between the outer edge 222 of the sealing portion 220 is reduced, which results in the rim 224 becoming tighter around the outer surface 214 of the flange 208.

Figure 3:
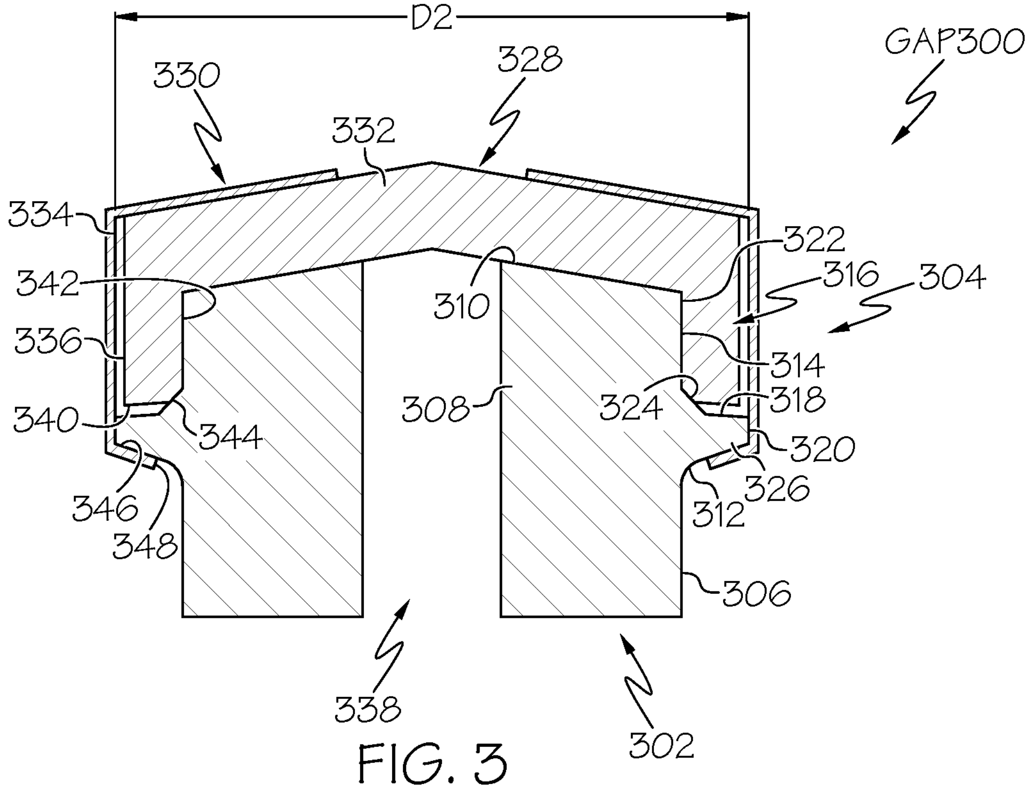
FIG. 3 schematically depicts a partial cross-sectional view of another embodiment of a pharmaceutical container, according to one or more embodiments shown and described herein.

Referring now to FIG. 3, a further embodiment of a pharmaceutical container 300 is illustrated including a glass container 302 and a sealing assembly 304. Although not described in detail herein, the glass container 302 and the sealing assembly 304 may include similar structure and features to the glass container 102, 202 and the sealing assembly 104, 204 described herein and illustrated FIGS. 1 and 2. As shown in FIG. 3, the glass container 302 includes a neck 306 extending to a flange 308 defined by an upper sealing surface 310, an underside surface 312, and an outer surface 314. As shown in FIG. 3, the outer surface 314 of the flange 308 is radially recessed inwardly defining a cutout portion 316. The outer surface 314 of the flange 308 includes an upperside surface portion 318 opposite the underside surface 312 and extending from an outermost edge 320 of the flange 308, and a vertical surface portion 322. The vertical surface portion 322 extends from a joining surface portion 324 at the upperside surface portion 318 to the upper sealing surface 310. In embodiments, the vertical surface portion 322 extends perpendicular to the upperside surface portion 318. In embodiments, the joining surface portion 324 extending between the upperside surface portion 318 and the vertical surface portion 322 forms a chamfer. The upperside surface portion 318, the outermost edge 320, and the underside surface 312 of the flange 308 cooperate to define a ledge 326. In embodiments, it should be noted that no sharp corners will be provided on the sealing assembly 304 and, rather, any angular surfaces should be chamfered or rounded to avoid the stress concentration.

In embodiments, the sealing assembly 304 includes a stopper 328 and a metal-containing cap 330. However, it should be appreciated that, in embodiments, the metal-containing cap 330 may not be provided. The stopper 328 includes a sealing portion 332 terminating at an outer edge 334 and a rim 336 extending from the outer edge 334 of the sealing portion 332. The sealing portion 332 has an outer diameter D2 defined by a distance between the outer edge 334 of the sealing portion 332. When the stopper 328 is positioned on the glass container 302, the sealing portion 332 extends over the upper sealing surface 310 of the flange 308 and covers an opening 338 formed in the glass container 302. The rim 336 extends from the outer edge 334 of the sealing portion 332 and at least partially along the outer surface 314 of the flange 308. As shown in FIG. 3, the rim 336 includes a bottom surface 340 that contacts the upperside surface portion 318 of the flange 308, an inner surface 342 that contacts the vertical surface portion 322 of the flange 308, and a joining surface portion 344 extending between the bottom surface 340 of the rim 336 and the inner surface 342 of the rim 336. The bottom surface 340, the inner surface 342, and the joining surface portion 344 of the rim 336 are received within the cutout portion 316 of the flange 308. In embodiments in which the joining surface portion 324 of the flange 308 forms a chamfer, the joining surface portion 344 of the rim 336 also forms a chamfer so as to nest with one another. In embodiments in which the metal-containing cap 330 is provided, the ledge 326 is provided between the bottom surface 340 of the rim 336 and an inner surface 346 of the metal-containing cap 330, specifically, an underlying portion 348 of the metal-containing cap 330, which extends radially inwardly along the underside surface 312 of the flange 308 and toward to the neck 306. As such, the ledge 326 of the flange 308 separates the rim 336 of the stopper 328 from the underlying portion 348 of the metal-containing cap 330.

It should be appreciated that when the pharmaceutical container 300 is subjected to relatively low storage temperatures, as discussed above, the coefficient of thermal expansion of the stopper 328 being greater than the coefficient of thermal expansion of the glass container 302 causes the rim 336 of the stopper 328 to shrink around and toward the flange 308 of the glass container 302, thus increasing the seal formed between the stopper 328 and the flange 308 of the glass container 302. More particularly, the sealing portion 332 of the stopper 328 shrinks during relatively low storage temperatures such that the outer diameter D2 between the outer edge 334 of the sealing portion 332 is reduced, which results in the rim 336 becoming tighter around the outer surface 314 of the flange 308.

Figure 4:
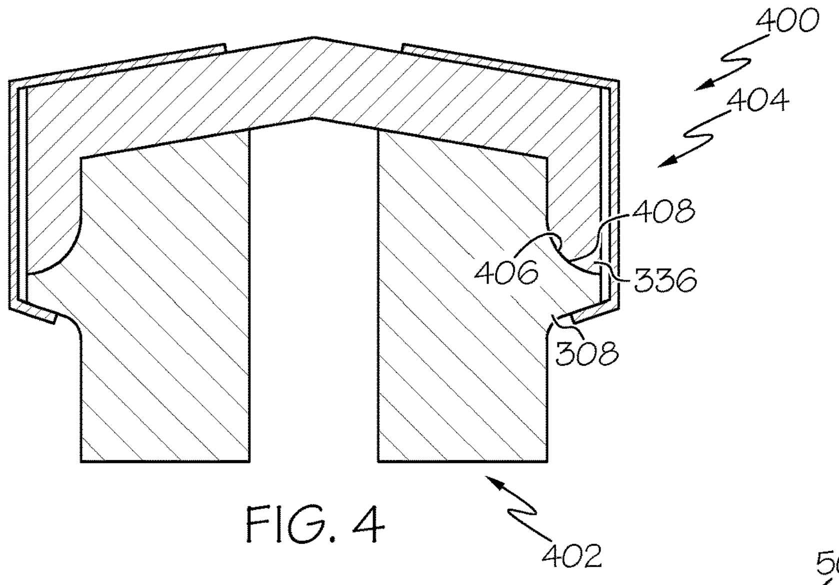
FIG. 4 schematically depicts a partial cross-sectional view of another embodiment of a pharmaceutical container, according to one or more embodiments shown and described herein.

Referring now to FIG. 4, a further embodiment of a pharmaceutical container 400 is illustrated including a glass container 402 and a sealing assembly 404. It should be appreciated that the pharmaceutical container 400 is similar to the pharmaceutical container 300 described herein and illustrated in FIG. 3 with the exception of the joining surface portion 324 of the flange 308 and the joining surface portion 344 of the rim 336. As described herein and illustrated in FIG. 3, the joining surface portion 324 of the flange 308 and the joining surface portion 344 of the rim 336 of the pharmaceutical container 300 form corresponding chamfers. However, the pharmaceutical container 400 illustrated in FIG. 4 includes a joining surface portion 406 formed in the flange 308 and a joining surface portion 408 formed in the rim 336 that are each arcuate and correspond to one another so as to nest with one another. The arcuate joining surface portions 406, 408 provide a smooth mating surface between the flange 308 and the rim 336 without sharp edges that might result in a gap between the flange 308 and the rim 336. Such a gap may result in air pockets being formed therebetween or allowing air to escape the formed seal.

Figure 5:
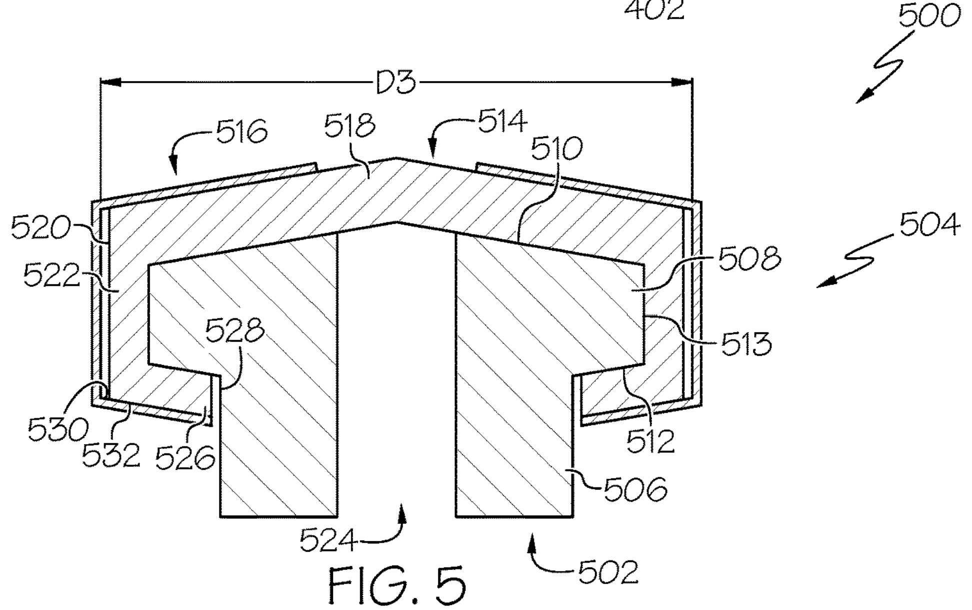
FIG. 5 schematically depicts a partial cross-sectional view of another embodiment of a pharmaceutical container, according to one or more embodiments shown and described herein.

Referring now to FIG. 5, a further embodiment of a pharmaceutical container 500 is illustrated including a glass container 502 and a sealing assembly 504. Although not described in detail herein, the glass container 502 and the sealing assembly 504 may include similar structure and features to the glass containers and the sealing assemblies described herein and illustrated FIGS. 1-4. As shown in FIG. 5, the glass container 502 includes a neck 506 extending to a flange 508 defined by an upper sealing surface 510, an underside surface 512, and an outer surface 513.

In embodiments, the sealing assembly 504 includes a stopper 514 and a metal-containing cap 516. However, it should be appreciated that, in embodiments, the metal-containing cap 516 may not be provided. The stopper 514 includes a sealing portion 518 terminating at an outer edge 520 and a rim 522 extending from the outer edge 520 of the sealing portion 518. The sealing portion 518 has an outer diameter D3 defined by a distance between the outer edge 520 of the sealing portion 518. When the stopper 514 is positioned on the glass container 502, the sealing portion 518 extends over the upper sealing surface 510 of the flange 508 and covers an opening 524 formed in the glass container 502. The rim 522 extends from the outer edge 520 of the sealing portion 518 and at least partially along an outer surface 513 of the flange 508. As shown in FIG. 5, the rim 522 has a length extending along at least an entire length of the outer surface 513 of the flange 508. The stopper 514 further includes a lip 526 extending radially inwardly from an end of the rim 522 opposite the sealing portion 518 and along the underside surface 512 of the flange 508 and terminating at an inner surface 528. In embodiments in which the metal-containing cap 516 is provided, the lip 526 extends along and contacts an inner surface 530 of the metal-containing cap 516, specifically, an underlying portion 532 of the metal-containing cap 516, which extends radially inwardly along the underside surface 512 of the flange 508 and toward to the neck 506, and the lip 526 contacts and extends along the underlying portion 532 of the metal-containing cap 516 to contact the neck 506.

It should be appreciated that when the pharmaceutical container 500 is subjected to relatively low storage temperatures, as discussed above, the coefficient of thermal expansion of the stopper 514 being greater than the coefficient of thermal expansion of the glass container 502 causes the rim 522 and the lip 526 of the stopper 514 to shrink around and toward the flange 508 of the glass container 502, thus increasing the seal formed between the stopper 514 and the flange 508 of the glass container 502. More particularly, the sealing portion 518 of the stopper 514 shrinks during relatively low storage temperatures such that the outer diameter D3 between the outer edge 520 of the sealing portion 518 is reduced, which results in the rim 522 and the lip 526 becoming tighter around the outer surface 513 of the flange 508.

Figure 6:
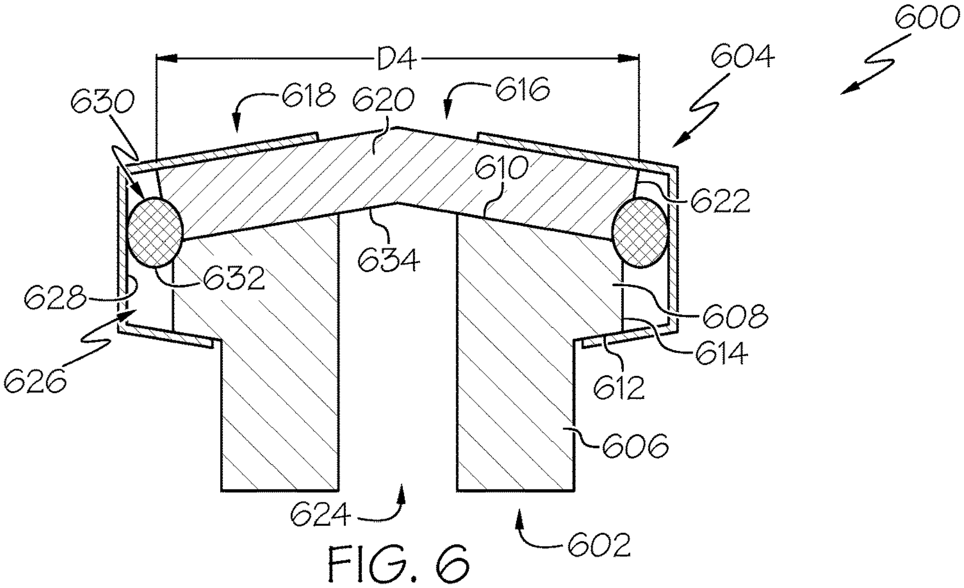
FIG. 6 schematically depicts a partial cross-sectional view of another embodiment of a pharmaceutical container, according to one or more embodiments shown and described herein.

Referring now to FIG. 6, a further embodiment of a pharmaceutical container 600 is illustrated including a glass container 602 and a sealing assembly 604. Although not described in detail herein, the glass container 602 and the sealing assembly 604 may include similar structure and features to the glass containers and the sealing assemblies described herein and illustrated FIGS. 1-5. As shown in FIG. 6, the glass container 602 includes a neck 606 extending to a flange 608 defined by an upper sealing surface 610, an underside surface 612, and an outer surface 614.

In embodiments, the sealing assembly 604 includes a stopper 616 and a metal-containing cap 618. However, it should be appreciated that, in embodiments, the metal-containing cap 618 may not be provided. The stopper 616 includes a sealing portion 620 terminating at an outer edge 622. The sealing portion 620 has an outer diameter D4 defined by a distance between the outer edge 622 of the sealing portion 620. When the stopper 616 is positioned on the glass container 602, the sealing portion 620 extends over the upper sealing surface 610 of the flange 608 and covers an opening 624 formed in the glass container 602. As shown in FIG. 6, a gap 626 is provided between the outer edge 622 of the sealing portion 620 and an inner surface 628 of the metal-containing cap 618. In embodiments, a polymer ring 630 is positioned to the outer edge 622 of the sealing portion 620 to extend across the gap 626 formed between the outer edge 622 of the sealing portion 620 and the inner surface 628 of the metal-containing cap 618. As such, the polymer ring 630 contacts the inner surface 628 of the metal-containing cap 618. As shown, the polymer ring 630 is offset from the outer edge 622 of the sealing portion 620 such that a lower surface 632 of the polymer ring 630 is lower than a lower surface 634 of the sealing portion 620. Thus, when the stopper 616 is positioned on the glass container 602, the polymer ring 630 extends partially along the outer surface 614 of the flange 608 of the glass container 602, thereby overlapping both the stopper 616 and the glass container 602. In embodiments, the polymer ring 630 has a CTE equal to or greater than the CTE of the stopper 616. In other embodiments, the polymer ring 630 has a CTE less than the CTE of the stopper 616. In these embodiments, the CTE of the polymer ring 630 may be substantially equal to the CTE of the glass container 602, such as within 10%. In embodiments, the polymer ring 630 may be adhered to the outer edge 622 of the sealing portion 620.

It should be appreciated that when the pharmaceutical container 600 is subjected to relatively low storage temperatures, as discussed above, the coefficient of thermal expansion of the stopper 616 being greater than the coefficient of thermal expansion of the glass container 602 causes the sealing portion 620 to shrink relative to the upper sealing surface 610 of the flange 608 such that the outer diameter D4 between the outer edge 622 of the sealing portion 620 is reduced. As the outer diameter D4 between the outer edge 622 of the sealing portion 620 is reduced, the polymer ring 630 is drawn radially inwardly toward the outer surface 614 of the flange 608, thus becoming tighter around the outer surface 614 of the flange 608. Additionally, although not illustrated in the stoppers of the pharmaceutical containers depicted in FIGS. 2-6, it should be appreciated that the stoppers may include an insertion portion extending into the opening of the respective glass container such as the insertion portion 117 illustrated in the pharmaceutical container 100 depicted in FIG. 1. Further, it should be appreciated that in any embodiment discussed herein in which two surfaces are shown in contact, such as an outer surface of the rim of the stopper and an inner surface of the metal-containing cap, a gap may be provided therebetween such that the two surfaces do not contact one another prior to shrinkage of the stopper.

From the above, it is to be appreciated that defined herein is a sealed pharmaceutical container including a glass container and a sealing assembly having a CTE higher than CTE of the glass container such that, when the sealed pharmaceutical container is subjected to relatively low temperatures, the seal formed between the glass container and the sealing assembly becomes tighter. Specifically, the sealing assembly includes a stopper including a sealing portion extending over an upper sealing surface of a flange of the glass container and covering an opening formed in the glass container. The sealing stopper further includes a rim extending at least partially along the outer surface of the flange.

Further aspects of the embodiments described herein are provided by the subject matter of the following clauses:

Clause 1. A sealed pharmaceutical container comprising: a shoulder; a neck extending from the shoulder; a flange extending from the neck, the flange comprising: an underside surface extending from the neck; an outer surface extending from the underside surface, the outer surface defining an outer diameter of the flange; and an upper sealing surface extending between the outer surface and an inner surface defining an opening in the sealed pharmaceutical container, and a sealing assembly comprising: a stopper including a sealing portion extending over the upper sealing surface of the flange and covering the opening, and a rim extending at least partially along the outer surface of the flange; and a metal-containing cap securing the stopper to the flange.

Clause 2. The sealed pharmaceutical container of clause 1, wherein the rim of the stopper extends along the entire outer surface of the flange.

Clause 3. The sealed pharmaceutical container of clause 1, wherein a cutout portion is formed in the outer surface of the flange extending in an inward radial direction, the rim of the stopper having a shape configured to nest within the cutout portion.

Clause 4. The sealed pharmaceutical container of clause 1, wherein the stopper includes a lip extending radially inwardly from an end of the rim opposite the sealing portion and along the underside surface of the flange.

Clause 5. The sealed pharmaceutical container of clause 1, wherein the rim comprises a polymer ring positioned along an outer edge of the stopper.

Clause 6. The sealed pharmaceutical container of any of clauses 1-5, wherein: the stopper has a glass transition temperature ($T_g$) that is less than or equal to −20° C.; and the sealing assembly maintains a helium leakage rate of the sealed pharmaceutical container at less than or equal to $1.4\times10^{-6}$ $cm^3/s$ as the sealed pharmaceutical container is cooled to a temperature of less than or equal to −20° C.

Clause 7. The sealed pharmaceutical container of clause 6, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

Clause 8. The sealed pharmaceutical container of clause 6, wherein the sealing assembly maintains the helium leakage rate of the sealed pharmaceutical container at less than or equal to $1.4\times10^{-6}$ $cm^3/s$ as the sealed pharmaceutical container is cooled to a temperature of less than or equal to −100° C.

Clause 9. The sealed pharmaceutical container of any of clauses 1-8, wherein the upper sealing surface is an inclined sealing surface extending at an angle relative to a plane extending through an end of the opening such that a distance between the inclined sealing surface and the plane increases with decreasing radial distance from the outer surface.

Clause 10. The sealed pharmaceutical container of clause 9, wherein the angle is greater than 5 degrees.

Clause 11. The sealed pharmaceutical container of clause 9, wherein the angle is less than or equal to 45 degrees.

Clause 12. The sealed pharmaceutical container of any of clauses 1-11, wherein the flange is constructed of a polymer.

Clause 13. The sealed pharmaceutical container of any of clauses 1-12, wherein a glass transition temperature of the stopper is less than or equal to −10° C.

Clause 14. A sealed pharmaceutical container comprising: a shoulder; a neck extending from the shoulder; a flange extending from the neck; an inner surface defining an opening extending through the neck and the flange, wherein the flange comprises an upper sealing surface extending from the inner surface and an outer surface extending from the upper sealing surface; and a sealing assembly comprising: a stopper including a sealing portion extending over the upper sealing surface of the flange and covering the opening, and a rim extending at least partially along the outer surface of the flange; and a metal-containing cap crimped to the flange, the metal-containing cap compressing the stopper against the upper sealing surface.

Clause 15. The sealed pharmaceutical container of clause 14, wherein the rim of the stopper extends along the entire outer surface of the flange.

Clause 16. The sealed pharmaceutical container of clause 14, wherein a cutout portion is formed in the outer surface of the flange extending in an inward radial direction, the rim of the stopper having a shape configured to nest within the cutout portion.

Clause 17. The sealed pharmaceutical container of clause 14, wherein the stopper includes a lip extending radially inwardly from an end of the rim opposite the sealing portion and along the underside surface of the flange.

Clause 18. The sealed pharmaceutical container of clause 14, wherein the rim comprises a polymer ring positioned along an outer edge of the stopper.

Clause 19. The sealed pharmaceutical container of any of clauses 14-18, wherein the compression is maintained on the upper sealing surface as the sealed pharmaceutical container is cooled to a temperature of less than or equal to −80° C. such that a helium leakage rate of the sealed pharmaceutical container is less than or equal to $1.4\times10^{-6}$ $cm^3/s$ at the temperature.

Clause 20. The sealed pharmaceutical container of any of clauses 14-19, wherein the upper sealing surface is an inclined sealing surface extending at an angle relative to a plane extending through an end of the opening, wherein the angle is less than or equal to 45 degrees.

Clause 21. The sealed pharmaceutical container of any of clauses 14-20, wherein the flange is constructed of a glass composition having a coefficient of thermal expansion that is greater than or equal to $0\times10^{-7}$/K and less than or equal to $70\times10^{-7}$/K.

Clause 22. The sealed pharmaceutical container of any of clauses 14-21, wherein a difference between a coefficient of thermal expansion ("CTE") of the metal-containing cap and a CTE of the stopper less than or equal to $50\times10^{-7}$/K.

Clause 23. The sealed pharmaceutical container of clause 22, wherein the CTE of the metal-containing cap is greater than or equal to $250\times10^{-7}$/K.

Clause 24. The sealed pharmaceutical container of clause 23, wherein the flange is formed from a polymer.

Clause 25. The sealed pharmaceutical container of clause 24, wherein the stopper has a CTE equal to or greater than a CTE of the flange.

Clause 26. The sealed pharmaceutical container of any of clauses 14-25, wherein a glass transition temperature of the stopper is less than or equal to −10° C.

Clause 27. The sealed pharmaceutical container of any of clauses 14-26, wherein the stopper comprises a low $T_g$ elastomer in contact with the upper sealing surface, the low Tg elastomer comprising one or more of a polybutadiene, silicone, a fluorosilicone, a nitrite, and an EPDM elastomer.

Clause 28. The sealed pharmaceutical container of clause 19, wherein the sealed pharmaceutical container maintains the helium leakage rate at less than or equal to $1.4\times10^{-6}$ $cm^3/s$.

Clause 29. The sealed pharmaceutical container of any of clauses 14-28, wherein the metal-containing cap maintains continuous compression of the stopper against the flange as the sealed pharmaceutical container is cooled.

Clause 30. The sealed pharmaceutical container of clause 19, wherein the sealing assembly maintains the helium leakage rate of the sealed pharmaceutical container at less than or equal to $1.4\times10^{-6}$ $cm^3/s$ as the sealed pharmaceutical container is cooled to a temperature of less than or equal to −20° C.

Clause 31. The sealed pharmaceutical container of clause 19, wherein the sealing assembly maintains the helium leakage rate of the sealed pharmaceutical container at less than or equal to $1.4\times10^{-6}$ $cm^3/s$ as the sealed pharmaceutical container is cooled to a temperature of less than or equal to −120° C.

Clause 32. A method of sealing a pharmaceutical container, the method comprising: providing a pharmaceutical container comprising a shoulder, a neck extending from the shoulder and a flange extending from the neck, the flange comprising: an underside surface extending from the neck; an outer surface extending from the underside surface, the outer surface defining an outer diameter of the flange; and an upper sealing surface extending between the outer surface to an inner surface of the pharmaceutical container that defines an opening; inserting a pharmaceutical composition into the pharmaceutical container; providing a stopper including a sealing portion extending over the upper sealing surface of the flange and covering the opening, and a rim extending at least partially along the outer surface of the flange; and crimping a metal-containing cap over the stopper and against flange to compress the stopper against the upper sealing surface.

Clause 33. The method of clause 32, further comprising cooling the pharmaceutical container to a temperature of less than or equal to −20° C., wherein, after the cooling of the pharmaceutical container, the compression is maintained on the upper sealing surface such that a helium leakage rate of the pharmaceutical container is less than or equal to $1.4\times10^{-6}$ $cm^3/s$ at the temperature.

Clause 34. The method of clause 32, wherein the rim of the stopper extends along the entire outer surface of the flange.

Clause 35. The method of clause 32, wherein a cutout portion is formed in the outer surface of the flange extending in an inward radial direction, the rim of the stopper having a shape configured to nest within the cutout portion.

Clause 36. The method of clause 32, wherein the stopper includes a lip extending radially inwardly from an end of the rim opposite the sealing portion and along the underside surface of the flange.

Clause 37. The method of clause 32, wherein adhering a polymer ring along an outer edge of the stopper.

Clause 38. A sealed pharmaceutical container comprising: a shoulder; a neck extending from the shoulder; and a flange extending from the neck, the flange comprising: an underside surface extending from the neck; an outer surface extending from the underside surface, the outer surface defining an outer diameter of the flange; and an upper sealing surface extending between the outer surface and an inner surface defining an opening in the sealed pharmaceutical container, wherein a cutout portion is formed in the outer surface of the flange extending in an inward radial direction.

Clause 39. The sealed pharmaceutical container of clause 38, wherein the outer surface of the flange comprises: an upperside surface portion opposite the underside surface and extending from an outermost edge of the flange; and a vertical surface portion extending from a joining surface portion at the upperside surface portion to the upper sealing surface.

Clause 40. The sealed pharmaceutical container of clause 39, wherein the vertical surface portion extends perpendicular to the upperside surface portion.

Clause 41. The sealed pharmaceutical container of clause 39 or clause 40, wherein the upperside surface portion, the outermost edge, and the underside surface of the flange cooperate to define a ledge.

Clause 42. The sealed pharmaceutical container of any of clauses 39-41, wherein the joining surface portion forms a chamfer.

Clause 43. The sealed pharmaceutical container of any of clauses 39-41, wherein the joining surface portion is arcuate.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A sealed pharmaceutical container comprising:

a shoulder;

a neck extending from the shoulder;

a flange extending from the neck, the flange comprising:

an underside surface extending from the neck;

an outer surface extending from the underside surface, the outer surface defining an outer diameter of the flange; and an upper sealing surface extending between the outer surface and an inner surface defining an opening in the sealed pharmaceutical container, wherein the upper sealing surface is an inclined sealing surface extending at an angle relative to a plane extending through an end of the opening such that a distance between the inclined sealing surface and the plane increases with decreasing radial distance from the outer surface, and a sealing assembly comprising:

a stopper including a sealing portion extending over the upper sealing surface of the flange and covering the opening, and a rim extending along the outer surface of the flange, wherein the rim has a bottom surface which extends collinear with the underside surface of the flange, the stopper having a glass transition temperature ($T_g$) that is greater than or equal to −70° C. and less than or equal to −10° C.; and a metal-containing cap securing the stopper to the flange, the metal-containing cap including an underlying portion that contacts the underside surface of the flange, wherein the sealed pharmaceutical container maintains a helium leakage rate at less than or equal to $1.4\times10^{-6}$ $Cm^3/s$ as the sealed pharmaceutical container is cooled to a temperature of less than or equal to −20° C.

2. The sealed pharmaceutical container of claim 1, wherein:

the glass transition temperature ($T_g$) is less than or equal to −20° C.

3. The sealed pharmaceutical container of claim 1, wherein the sealing assembly maintains the helium leakage rate of the sealed pharmaceutical container at less than or equal to 1.4×10−6 $cm^3/s$ as the sealed pharmaceutical container is cooled to a temperature of less than or equal to −80° C.

4. The sealed pharmaceutical container of claim 1, wherein the helium leakage rate of the sealed pharmaceutical container is less than or equal to $1.4\times10^{-6}$ $cm^3/s$ as the sealed pharmaceutical container is cooled to a temperature of less than or equal to −100° C.

5. The sealed pharmaceutical container of claim 1, wherein the angle is greater than 5 degrees.

6. The sealed pharmaceutical container of claim 1, wherein the angle is less than or equal to 45 degrees.

7. The sealed pharmaceutical container of claim 1, wherein the flange is constructed of a polymer.

8. A method of sealing a pharmaceutical container, the method comprising:

providing a pharmaceutical container comprising a shoulder, a neck extending from the shoulder and a flange extending from the neck, the flange comprising:

an underside surface extending from the neck;

an outer surface extending from the underside surface, the outer surface defining an outer diameter of the flange; and an upper sealing surface extending between the outer surface to an inner surface of the pharmaceutical container that defines an opening;

inserting a pharmaceutical composition into the pharmaceutical container;

providing a stopper having a glass transition temperature ($T_g$) that is greater than or equal to −70° C. and less than or equal to −10° C. and including a sealing portion extending over the upper sealing surface of the flange and covering the opening, and a rim extending along the outer surface of the flange, wherein the rim has a bottom surface which extends collinear with the underside surface of the flange;

crimping a metal-containing cap over the stopper and against flange, including an underlying portion that contacts the underside surface of the flange, to compress the stopper against the upper sealing surface; and cooling the pharmaceutical container to a temperature of less than or equal to −20° C., wherein after the cooling of the pharmaceutical container the compression is maintained on the upper sealing surface such that a helium leakage rate of the pharmaceutical container is less than or equal to $1.4\times10^{-6}$ $cm^3/s$ at the temperature.

* * * * *